E. F. DAWS.
GASOLENE STRAINER.
APPLICATION FILED MAY 5, 1913.
1,107,766.
Patented Aug. 18, 1914.
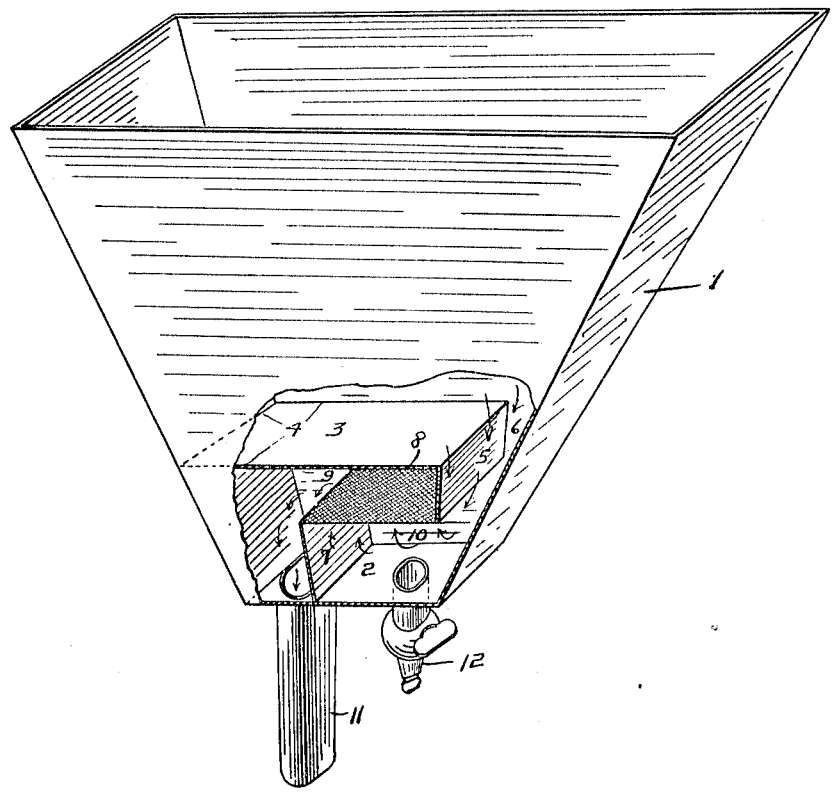
WITNESSES:
INVENTOR
E. F. DAWS
BY
Milton S. Crandall
ATTORNEY

UNITED STATES PATENT OFFICE.

EDGAR F. DAWS, OF SIOUX CITY, IOWA.

GASOLENE-STRAINER.

1,107,766.  Specification of Letters Patent.  Patented Aug. 18, 1914.

Application filed May 5, 1913. Serial No. 765,587.

*To all whom it may concern:*

Be it known that I, EDGAR F. DAWS, a citizen of the United States, and a resident of Sioux City, in the county of Woodbury and State of Iowa, have invented certain new and useful Improvements in Gasolene-Strainers, of which the following is a specification.

This invention relates to means for separating liquids and heavier materials.

The object of the invention is the production of an improved gasolene strainer inexpensive in manufacture yet thoroughly efficient in operation.

The device of my invention may be defined as a vessel provided with two compartments, one above the other, and separated by a screen or other member suitable for straining. The upper compartment may be provided with an outlet for conveying the clarified gasolene to a suitable container and the lower compartment have communication with a source of gasolene supply above the level of the screen.

My invention will be more fully understood from the following description, reference being had to the accompanying drawing, which is a perspective view of a device suitable for practising my invention, a portion being cut away to reveal the internal characteristics.

In the illustration 1 is a funnel body, which may be of any suitable material and shape, yet preferably of sheet-metal and rectangular in horizontal section and with walls flaring outwardly from the bottom, 2, as illustrated. A horizontal partition, 3, is secured, by soldering to three of the funnel walls, indicated at 4. The free end, 5, of the partition, is bent downwardly and thus affords a passageway, 6, between the top and the bottom of the funnel. A vertical partition, 7, is soldered to the bottom, 2, and the front and rear walls of the funnel. The upper end of this partition and the lower edge of the partition end, 5, are in a horizontal plane and to and between these members is secured a straining member, 8, of any suitable sized mesh. By virtue of this construction the bottom of the funnel is divided into an upper compartment, 9, and a lower compartment, or water-trap, 10. The upper compartment communicates with an outlet-spout, 11. Obviously, the partition, 7, affords a passageway between the compartment, 9, and the outlet.

The bottom of the water-trap, 10, is provided with an outlet, as the pet-cock, 12, yet its presence is arbitrary, as the water may be removed by inverting the funnel.

In operation gasolene introduced into the funnel enters the water-trap, 10, through the passage, 6, and after rising in the water trap passes through the screen and thence through the compartment 9 and the outlet. As the gasolene enters the water-trap all water and sediment precipitate and do not come into contact with the screen. Therefore, a screen of comparatively coarser mesh than that employed in the prior art may be used, thereby rendering the process much more rapid.

Having thus described my invention, what I claim as new and desire to secure by Letters Patent of the United States, is,—

An article of the class described comprising a vessel having walls flaring outwardly from the bottom; an impervious member horizontally disposed within the vessel and having edges secured to the walls thereof and a portion bent downwardly to afford a passage from the top to the bottom of the vessel; an upright impervious member secured to the bottom and opposite walls, said upright member being positioned intermediate the walls to which it is not secured and having its upper edge substantially the same distance from said horizontal member as the edge of the downwardly bent portion of the latter member; a straining member extending between and secured to the free edges of the impervious members and opposite walls of the vessel; and an outlet spout depending from the bottom and communicating with the interior of the vessel on the side of the vertical member opposite from the straining member.

In witness whereof I have hereunto set my hand in the presence of two subscribing witnesses this 1st day of May, 1913.

EDGAR F. DAWS.

Witnesses:
GEORGE W. BARR,
M. BURKHEAD.